3,479,333
D-PHE⁷-α¹⁻¹⁰-A.C.T.H. AND DERIVATIVES AND
COMPLEXES THEREOF
Hendrik Maria Greven, Heesch, Netherlands, assignor to
Organon Inc., West Orange, N.J., a corporation of New
Jersey
No Drawing. Filed July 1, 1966, Ser. No. 562,079
Claims priority, application Netherlands, July 28, 1965,
6509727
Int. Cl. C07g 7/00; C07c 103/52; C08h 1/00
U.S. Cl. 260—112.5                                 3 Claims

ABSTRACT OF THE DISCLOSURE

The invention concerns new biologically active decapeptides having the sequence of the first 10 amino acid residues of the adrenocorticotropic hormone molecule, counted from the N-terminal, and in which at least the phenylalanine residue occurs in the D-form, their salts, esters, carboxylamides, and N-acylates, and their sparingly soluble compounds with salts, oxides and hydroxides of zinc, nickel, cobalt, copper and iron, and possessing greatly enhanced fat mobilizing activity. Among the peptides disclosed are: D-Phe⁷, D-Phe⁷-D-Arg⁸, D-Tyr²-D-Phe⁷-

D-Ser¹-D-Tyr²-D-Phe⁷- and

D-Ser¹-D-Tyr²-D-Phe⁷-D-Arg⁸-α¹⁻¹⁰=A.C.T.H.

---

The invention relates to the preparation of new decapeptides with the sequence of the first 10 amino acid residues of the adrenacorticotropic hormone molecule, counted from N-terminal of the molecule.

The known decapeptide of this amino acid sequence, in which all the optically active amino acid residues occur in the L-configuration, has been described in, for instance, Helv. Chim. Acta 44, 1991 (1961). This compound is known to stimulate the melanocytes (MSH action) as described in Recent Progress in Hormone Research 18, 63 (1962). Further the decapeptide stimulates the secretion of the adrenocorticotropic hormone (ACTH) from the pituitary gland (CRF action), see Experientia 16, 414 (1960). Finally it is described in Nature 189, 681 (1961) that this peptide in vitro, after incubation with fat tissue of species of animals sensitive to it, exerts an activity on the mobilization of fat depots, raising the level of free fatty acids in the incubation medium. The latter activity, measured as a minimum effective dose on the fat tissue of rabbits, is about 1/14 of that of the ACTH itself, see Arch. Biochem. Biophys. 99, 294 (1962).

A process has been found now for the preparation of biologically active decapeptides, with the sequence of the first 10 amino acid residues of the adrenocorticotropic hormone molecule, counted from the N-terminal, characterized in that a decapeptide is prepared, in which at least the phenylalanine residue occurs in the D-form, in a manner known for the synthesis of peptides from L-amino acids.

The new decapeptides distinguish from the known decapeptide, in which the first 9 amino acid residues possess the L-configuration, by their enhanced fat mobilizing activity, measured in vitro at 50% response and in vivo. For instance, the activity of the 7-D-Phe-decapeptide, is more than 10 times greater than that of the known decapeptide. Further, it was found that decapeptides, in which at least the phenylalanine residue occurs in the D-configuration, have a surprising effect on the conditioned behavior of rats, viz, an accelerated extinction of the acquired behavior.

The synthesis of these compounds can take place by the methods known for the synthesis of peptides from L-amino acids. Apart from the optical isomerism these peptides can be indicated by the following amino acid sequence:

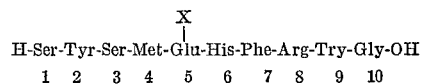

H-Ser-Tyr-Ser-Met-Glu-His-Phe-Arg-Try-Gly-OH
 1    2    3    4    5    6    7    8    9   10 in which X=OH or NH₂.

Thus the tripeptide (1-3) known from Angew. Chem. 72, 915 (1960) can be coupled with the heptapepide (4-10). According to Helv. Chim. Acta 44, 1991 (1961) it is also possible to couple the tetrapeptide (1-4) with the hexapeptide (5-10), or the pentapeptide (1-5) described in J. Am. Chem. Soc. 79, 1636 (1957) with the pentapeptide (6-10) from Nature 182, 1669 (1958), and J. Am. Chem. Soc. 80, 1486 (1958) respectively. Also the dipeptide (1-2) from said J. Am. Chem. Soc. 79, 1636 (1957) could be coupled with the octapeptide (3-10), described in J. Am. Chem. Soc. 79, 6087 (1957).

These couplings can be performed by the conventional methods for peptide syntheses, for instance, by means of dicyclohexylcarbodiimide or by the so-called azide method. For this purpose use is made of the known methods for the protection of the functional groups of the amino acids and peptides that do not take part in the reaction. In general groups are employed which, after the formation of the peptide bond, can be readily split off again by hydrolysis or reduction.

In vitro the fat mobilizing activity of the present compounds is determined by measuring the content of non-esterified fatty acids (NEFA) after incubation of fat tissue with the active compound during a fixed time. In this process the method of White and Engel described in J. Clin. Invest. 37, 1556 (1958) is chiefly adapted. As test animals are mostly used rabbits and rats, which provide to be sensitive to fat mobilizing substances. The determination can be summarized as follows:

The fat tissue taken from the animals, i.e., from the abdominal cavity of the rat or from the kidneys of the rabbit, is passed as quickly as possible, in portions of 50 mg., into 25-ml. incubation beakers, filled with 1 ml. of the Krebs-Ringer bicarbonate buffer containing 4% cattle albumin and 0.01 ml. solution of the substance to be examined in this buffer. The buffer is saturated with a gas mixture composed of 95% oxygen and 5% carbon dioxide. The beakers are shaken for 3 hours at 37° C. Next their contents are passed into centrifuge tubes to which are added 2.5 ml. of an extraction mixture consisting of 40 parts by volume of isopropyl alcohol, 10 parts of heptane and 1 part of 1 N sulfuric acid solution. After standing overnight ml. of heptane and 2 ml. of distilled water are further added. Next the tubes are shaken for 2 minutes and the contents centrifuged. In the liquid the quantity of NEFA is determined by titration with an indicator mixture according to Dole, described in J. Clin. Invest. 35, 150 (1956). After making the necessary corrections the net quantity of NEFA formed is expressed in μgm. equivalent NEFA per gm. fat tissue per 3 hours. By comparison of the dose activity curves the ratio of the activities of the various preparations can be determined.

In Table 1 given below the results are stated of the determinations performed with the known decapeptide, called here "All L"-decapeptide, in which all the optically active amino acid residues occur in the L-configuration, and with the decapeptide, in which the L-phenylalanine residue in position 7 has been replaced by the corresponding residue in the D-configuration. Of 5 different dosages the quantity of NEFA was determined. As test animals rabbits were used. All the determinations were performed in triplicate.

TABLE 1

| Preparation | Dosage in mg. | µ eq. NEFA/ gm./fat/ 3 hours |
|---|---|---|
| "All L" decapeptide | 0.04 | 1.3±0.1 |
|  | 0.2 | 2.5±0.7 |
|  | 1.0 | 5.9±1.4 |
|  | 5.0 | 12.8±3.5 |
|  | 25.0 | 19.3±2.5 |
| 7-D-Phe-decapeptide | 0.04 | 2.2±0.7 |
|  | 0.2 | 8.5±1.2 |
|  | 1.0 | 14.7±0.6 |
|  | 5.0 | 17.1±1.7 |
|  | 25.0 | 20.2±3.1 |

Compared with the "All L"-decapeptide the fat mobilizing activity of the decapeptide, in which the L-phenylalanine residue has been replaced by the corresponding D-form, is clearly enhanced. This enhancement may have been caused owing to the fact that the intrinsic activity of the decapeptide has been raised by the replacement of the L-amino acid by its D-form or owing to the fact that the decomposition of these peptides in the tissue is slighter. The latter cause seems the most probable.

Besides in vitro the above preparations were also tested in vivo in rabbits by measuring the quantity of the NEFA given off to the blood after increasing periods and after administration of the preparation to be examined in different dosages.

TABLE 2

| Preparation | Dosage in mg I.V. | Animal | µeq. NEFA/l serum at given times (hours) | | | | |
|---|---|---|---|---|---|---|---|
| | | | 0 | ½ | 1 | 2 | 4 |
| "All L"-decapeptide | 1.0 | V1 | 400 | 1,370 | 710 | 710 | 710 |
|  | 1.0 | V2 | 92 | 1,650 | 710 | 650 | 950 |
|  | 5.0 | V3 | 630 | 2,590 | 2,020 | 843 | 800 |
|  | 5.0 | V4 | 790 | 3,050 | 2,680 | 544 | 576 |
| 7-D-Phe-decapeptide | 0.2 | V5 | 705 | 756 | 768 | 1,250 | 1,120 |
|  | 0.2 | V6 | 534 | 2,290 | 1,910 | 1,205 | 1,055 |
|  | 1.0 | V7 | 576 | 3,160 | 2,470 | 1,535 | 1,230 |
|  | 1.0 | V8 | 394 | 2,810 | 2,240 | 1,980 | 1,040 |
|  | 5.0 | V9 | 156 | 4,230 | 4,280 | 3,520 | ------ |
|  | 5.0 | V10 | 1,220 | 4,300 | 5,100 | 4,450 | ------ |

NOTE.—NEFA values higher than 1000 µeq. are regarded as positive reactions.

From this table it appears that the ratio of the in vivo activity of the 7-D-Phe-decapeptide and the "All-L"-decapeptide is about the same as that of the activity measured in vitro. The activity of the first preparation is still present after 2 and after 4 hours, while the rise in the NEFA content caused by the latter preparation is of much shorter duration. Hence the conclusion is justified that the D-Phe-peptide in the body is decomposed less readily.

One of the experimental set-ups in which the conditioned behavior of rats can be studied is the one in which use is made of a "pole jump cage." Rats are conditioned to jump into a pole as soon as a light is produced, the so-called conditioned stimulus. Five seconds after this conditioned stimulus an electric current is passed through the metal grid floor, causing a shock. On three consecutive days ten conditioning trials were given each day with a fixed intertrial interval of 60 seconds. Rats which performed at least ten positive responses during these three days to the thirty trials made, were considered to be conditioned and used for extinction trials. In these trials it is ascertained how quickly the acquired behavior is extinguished again by fixing the number of positive responses of the rats to the conditioned stimulus. The same procedure is followed as in learning, except that the unconditioned stimulus, viz, electric shock, is omitted. The total number of positive conditioned responses of each rat scored during either learning or extinction serves as an index for the conditioned avoidance behavior of the animal. ACTH is known to retard the extinction of conditioned behavior as described by J. V. Murphy et al. in J. Comp. Physiol. Psychol. 48, 47 (1955). The N-terminal decapeptide of ACTH has the same effect if it is administered once subcutaneously, in a dose of 10 µg. per animal, in the form of an adsorption complex with zinc phosphate just after the learning period, and just before the extinction period. Surprisingly it was found that decapeptides in which at least the phenylalanine residue occurs in the D-form show an extinction accelerating instead of an extinction retarding activity, administered in the form of a sparingly soluble complex with an insoluble salt, oxide or hydroxide of zinc, nickel, cobalt, copper or iron. The results are incorporated in the following table.

TABLE 3

| Period studied | Peptide administered | Index conditioned avoidance behavior of an average of 8-10 animals |
|---|---|---|
| Conditioning period | None | 13 |
| Extinction period | Placebo | 10 |
|  | ACTH, 3 I. U | 23 |
|  | "All L"-decapeptide, 10 µg | 20 |
|  | 7-D-Phe-decapeptide, 10 µg | 6 |

Besides the preparation of the free decapeptides, in which at least the phenylalanine residue occurs in the D-form, the invention also comprises the preparation of the functional derivatives thereof, by which is meant:

(a) The salts, both the metal and ammonium salts of the carboxyl functions, especially the water-soluble salts, such as the addition salts of the $NH_2$-functions with inorganic acids, such as hydrochloric acid, hydrobromic acid, sulfuric acid and phosphoric acid, and with organic acids, such as acetic acid, succinic acid, malonic acid, lactic acid, tartaric acid, citric acid, benzoic acid and aliphatic and aromatic sulfonic acids;

(b) The N-terminal acyl compounds, such as the acetyl and the benzoyl compounds;

(c) The esters of the carboxyl functions, for example, derived from lower aliphatic alcohols;

(d) The acid amides of the carboxyl functions, such as of the γ-carboxyl function of the glutamic acid residue, and especially the amide of the C-terminal glycine;

(e) The peptides in which the $—NH_2$-group is blocked, for example, by a tosyl, trityl, benzyloxycarbonyl or t-butyloxycarbonyl group;

(f) The sparingly soluble complex compounds consisting of a pharmaceutically acceptable, sparingly soluble salt, hydroxide or oxide of one or more of the metals: zinc, nickel, cobalt, copper and iron and the present peptides. These complex compounds are characterized by their prolonged activity with respect to the corresponding decapeptide. The ratios between the quantities by weight of metal and peptide from (1:1) to (100:1) have proved to be favorable.

The present decapeptides and their derivatives can be brought into a form suitable for medical use by means of known auxiliaries suitable for administration, for instance, into the form of tablets for enteral, sublingual or oromucosal administration and into a form suitable for injection, for example, into that of a solution, emulsion or suspension. The conventional auxiliaries can be used for this purpose.

Besides as medicines the present decapeptides can be employed as intermediates for the preparation of medicines with a longer amino acid chain, e.g., peptides with ACTH-activity.

The following examples describe the synthesis of a few decapeptides according to the invention.

EXAMPLE 1

Synthesis of the 7-D-Phe-decapeptide according to the following scheme:

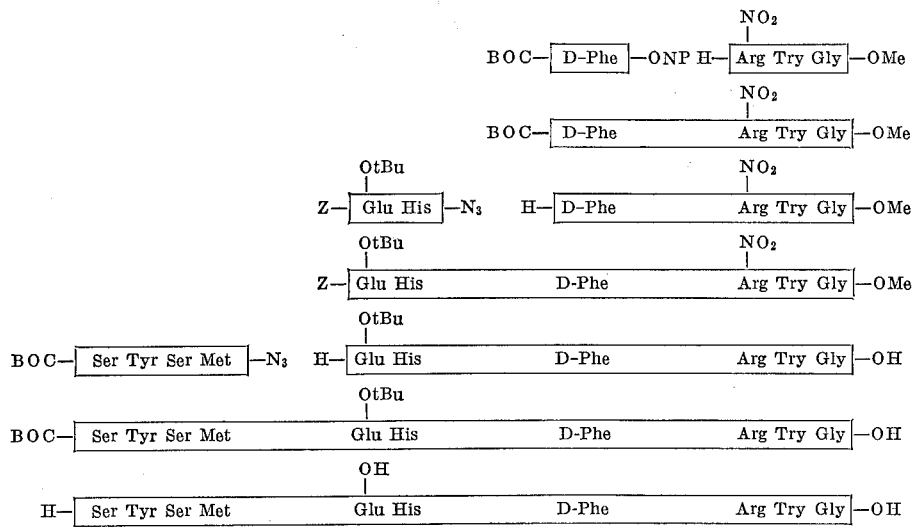

In this scheme the amino acids are indicated by their usual abbreviations. All the optically active amino acid residues, except those of phenylalanine, are present in the L-configuration.

Further, the following abbreviations are used:

BOC: t-butyloxycarbonyl
Z: benzyloxycarbonyl
Me: methyl
PN: p-nitrophenyl
tBu: t-butyl (1) BOC-D-Phe-ONP To a solution of 37 gm. of BOC-D-Phe-OH and 19.3 gm. of p-nitrophenol in 100 ml. of ethyl acetate are added 28.1 gm. of dicyclohexylcarbodiimide in 100 ml. of ethylacetate. While stirring the reaction mixture is left to stand for 1 hour at −5° C. and after that for 2 hours at room temperature. Next the mixture is filtered and the filtrate evaporated to dryness. The residue is crystallized from ethyl acetate to obtain 40.1 gm. of the ester (80%), melting point: 128–128.5° C. and $[\alpha]_D = +22.3°$ in dimethylformamide.

(2) BOC-D-Phe-Arg (NO₂)-Try-Gly-OMe 38.6 gm. of BOC-D-Phe-ONP are dissolved in a solution of 55.2 gm. of H-Arg (NO₂)-Try-Gly-OMe 2.1 HCl in 300 ml. of dimethylformamide of 0° C. After the addition of 29.4 ml. of triethylamine the mixture is stirred for 1 hour at 0° C. and one night at room temperature. After evaporation in vacuo the remaining oil is dissolved in 700 ml. of ethyl acetate and after that washed subsequently with 5% citric acid solution and water, 5% sodium bicarbonate solution, water, 5% citric acid solution, water and further dried and evaporated in vacuo. The residue obtained is dissolved in 100 ml. of ethanol and this solution is poured out into 1 liter of dry ether while stirring vigorously and next filtered and dried to obtain 60 gm. of the tetrapeptide ester (80%); $[\alpha]_D = −43.3°$ in methanol.

(3) H-D-Phe-Arg (NO₂)-Try-Gly-OMe. HCl 48 gm. of BOC-tetrapeptide ester prepared according to (2) are suspended in a mixture of 500 ml. of dry ethyl acetate and 100 ml. of nitromethane. After the addition of 105 ml. of a 6 N solution of HCl in ethyl acetate all the substance dissolves at first, after which an oil separates out, which soon becomes solid. After stirring for 1.5 hours the precipitate is filtered. Yield: 44.5 gm. (94%). In this case the preparation contained 2 mol. of hydrochloric acid per mol. of tetrapeptide.

(4) Z-Glu-(OtBu)-His-D-Phe-Arg (NO₂)-Try-Gly-OMe

To a solution of 3.36 gm. of H-D-Phe-Arg(NO₂)-Try-Gly-Ome 1.45 HCl in 30 ml. at dimethylformamide of 0° C. is added 0.72 gm. of triethylamine, next 0.08 ml. of acetic acid and finally a solution of 3 gm. of Z-Glu (OtBu)-His-N₃ in 49 ml. of ethyl acetate. After standing for 60 hours at 0° C. the reaction mixture is evaporated in vacuo and the solution obtained poured out into 500 ml. of water. The resulting precipitate is extracted twice with 200 ml. of ethyl acetate. After washing the organic layer until neutral reaction it is evaporated to dryness. The residue is boiled up with ethyl acetate to obtain 3.16 gm. (58%) of the protected hexapeptide ester; melting point 128° C. and $[\alpha]_D = −14.6°$ in dimethylformamide.

(5) Z-Glu(OtBu)-His-D-Phe-Arg(NO₂)-Try-Gly-OH 3.04 gm. of Z-hexapeptide ester prepared according to (4) are dissolved in a mixture of 40 ml. of dioxane and 10 ml. of water. After the addition of 3.1 ml. of 1 N alkali the ester is saponified in 35 minutes. Next 3.2 ml. of 1 N hydrochloric acid and 300 ml. of water are added when a precipitate separates out. After filtration, washing and drying of this precipitate at 30° C., in vacuo, the Z-hexapeptide acid is obtained in a yield of 2.65 gm. (88%); $[\alpha]_D = 18.4°$ in dimethylformamide.

(6) H-Glu-(OtBu)-His-D-Phe-Arg-Try-Gly-OH 2.5 gm. of the Z-hexapeptide acid prepared according to (5) are suspended in 40 ml. of 90% acetic acid. Next 400 mg. of a 10% palladium carbon catalyst are added, whereupon the mixture is hydrogenated at 20° C. and 3 atmospheres overpressure for 48 hours. After evaporation to dryness of the reaction product in vacuo 250 ml. of dry ether are added. A pink precipitate forms, which is washed with ether and dried to obtain 2 gm. of the hexapeptide; $[\alpha]_D = 0°$ in dimethylformamide.

(7) BOC-Ser-Tyr-Ser-Met-Glu(OtBu)-His-
D-Phe-Arg-Try-Gly-OH

From 4.4 gm. of BOC-Ser-Tyr-Ser-Met-$N_2H_3$ and sodium nitrite the azide is prepared in a known manner, which is subsequently added to a solution of 5.1 gm. of the hexapeptide prepared according to (6) in 75 ml. of dimethylformamide of 0° C. To this solution is added 0.6 gm. of triethylamine, after which the mixture is left to stand for 4 days at 0° C. After evaporation to dryness the reaction product is chromatographed over a column filled with carboxymethyl cellulose. The substance is passed into a mixture of t-butanol-water (1:1) and eluted with a dilute acetic acid solution to obtain 1.8 gm. of the protected decapeptide. An amino acid analysis in accordance with Stein and Moore of this product gives the results indicated in the table given below, expressed in mol. percentages:

TABLE 4

| Amino acid: | Mol percent |
|---|---|
| His | 90.3 |
| Arg | 85.3 |
| Ser | 89.6 |
| Glu | 90.5 |
| Gly | 95.7 |
| Met | 85.9 |
| Tyr | 94.0 |
| Phe | 92.3 |

(8) 7-D-Phe-decapeptide 450 mg. of the protected decapeptide are dissolved in 2 ml. of a mixture of 10 ml. of trifluoroacetic acid and 1 ml. of water. After 1 hour the red colored solution is evaporated to dryness, after which the residue is taken up in a mixture of t-butanol-water (1:1) and next treated with an ion exchanger in the acetate form. Next the solution is filtered and lyophilized. Yield of 7-D-Phe-decapeptide: 392.4 mg.

EXAMPLE 2

EXAMPLE 2.—SYNTHESIS OF THE 2-D-TYR-7-D-PHE-DECAPEPTIDE (1) BOC-Ser-D-Tyr-OMe 29.1 gm. of dicyclohexylamine salt of BOC-Ser-OH and 17.5 gm. of H-D-Tyr-OMe HCl are suspended in a mixture of 94 ml. of dimethylformamide and 470 ml. of acetonitrile. After stirring for 30 minutes at 20° C. the suspension is cooled to −2° C. To this mixture are added while cooling down to below 0° C. a solution of 15.5 gm. dicyclohexylcarbodiimide in 57 ml. of acetonitrile. After stirring for 4 hours at 0° C. stirring takes place next at room temperature. Next the reaction mixture is filtered and evaporated in vacuo. The resulting residue is taken up in ethyl acetate and subsequently washed with 5% citric acid solution, water, 5% sodium bicarbonate solution and water. After drying a foam is obtained in a yield of 25.3 gm., which was used for the next step without further purification.

(2) BOC-Ser-D-Tyr-$N_2H_3$

To 10.7 gm. of the crude dipeptide prepared according to (2), dissolved in 70 ml. of methanol, are added 2.8 ml. of hydrazine hydrate, after which the mixture is left to stand overnight at room temperature. After the addition of 5 ml. of water the precipitate formed is filtered. The hydrazide crystallizes from t-butanol-water (1:1). Yield 3.3 gm. (31%); melting point 120° C. while decomposing, $[\alpha]_D = -4.0°$ in dimethylformamide.

(3) BOC-Ser-D-Tyr-Ser-Met-OMe 3.6 gm. of the hydrazide according to (2) are dissolved in 17 ml. of 2 N hydrochloric acid of 0° C. To it are added 0.69 gm. of sodium nitrite in 3 ml. of water and next 15 ml. of dimethylformamide of 0° C. After shaking for 8 minutes the reaction mixture is diluted with 20 ml. of water and 20 ml. of 2 N potassium carbonate. Next the mixture is extracted 3 times, each time with 20 ml. of ethyl acetate. The collected extracts are washed twice with water. Meanwhile 1.9 gm. of H-Ser-Met-OMe in 5 ml. of dimethylformamide of 0° C. are suspended. To it the azide solution is added, after which the mixture is stored for 74 hours at 0° C. Next it is washed with water, dried and evaporated to dryness. The residue is an oil which could not be crystallized yet. Yield 3.2 gm. (56%); $[\alpha]_D = -32.0°$ in methanol.

(4) BOC-Ser-D-Tyr-Ser-Met-$N_2H_3$ 1.9 gm. of tetrapeptide-ester according to (3) are dissolved in 10 ml. of methanol. To the solution 0.32 gm. of hydrazine hydrate is added, after which the mixture is stored for 60 hours at room temperature and for 24 hours at 0° C. Next the precipitate formed is filtered and dried. After crystallization from methanol-ethyl acetate (1:5), 1.3 gm. of hydrazide are obtained (68%); melting point 164–165° C. and $[\alpha]_D = -42.6°$ in methanol-water (1:1).

(5) "Protected"-2-D-Tyr-7-D-Phe-decapeptide 550 mg. of the hydrazide prepared according to (4) is dissolved in 5 ml. of dimethylformamide. After cooling down to −20° C., 2.25 ml. of 1 N hydrochloric acid are added. Next a solution of 0.06 gm. of sodium nitrite in 1 ml. of water is added at 0° C. and the mixture stirred for 8 minutes, after which it is neutralized with 2 ml. of 2.5 N potassium bicarbonate. Next the mixture is extracted twice, each time with 15 ml. of ethyl acetate, whereupon the extracts are washed with water, evaporated to 5 ml. in total and added to a solution of 750 mg. of the hexapeptide mentioned in Example 1 under (6):

H-Glu(OtBu)-His-D-Phe-Arg-Try-Gly-OH in a mixture of 20 ml. of dimethylformamide and 0.15 gm. of triethylamine. After standing for 40 hours at 0° C. the solution is evaporated to 7.5 ml. and diluted with water to 150 ml. After filtration the precipitate is dried in high vacuo at 35° C. to obtain a yield of 450 mg. of the protected decapeptide:

BOC-Ser-D-Tyr-Ser-Met-Glu(OtBu)-
His-D-Phe-Arg-Try-Gly-OH

Rf=0.23 measured in thin layer chromatography on $Al_2O_3$ with the system: ethyl acetate:pyridine:acetic acid:water=60:20:6:11. After splitting off the protecting groupings by means of a mixture of trifluoroacetic acid-water (10:1) the resulting decapeptide trifluoroacetate is treated with an ion exchanger in the acetate form to obtain 305 mg. of the 2-D-Tyr-7-D-Phe-decapeptide. Rf=0.58 on $SiO_2$ with the system: n-butanol:acetic acid:water=100:15:35.

EXAMPLE 3

Synthesis of the 1-D-Ser-2-D-Tyr-7-D-Phe-decapeptide, Starting from 5.1 gm. of dicyclohexylamine salt of BOC-D-Ser-OH, and 3.1 gm., of H-D-Tyr-OMe.HCl, 3.8 gm. of dipeptide ester are obtained; melting point 123–126° C. and $[\alpha]_D = +1°$ in methanol. From it 3.2 gm. of the corresponding hydrazide are obtained of melting point 196–200° C., while decomposing, and $[\alpha]_D = +17.3°$ in acetic acid. The tetrapeptide BOC-D-Ser-D-Tyr-Ser-Met-OMe is obtained as a resinous product in a yield of 3.0 gm., which are converted without further purification into 2.7 gm. of the corresponding hydrazide. Equivalence weight titration by means of perchloric acid in acetic acid indicates the presence of a trace of free hydrazine, which is bound like a salt, 800 mg. of the obtained BOC-D-Ser-D-Tyr-Ser-Met-$N_2H_3$ are coupled with 1.1 gm. of the hexapeptide M-Glu(OtBu)-His-D-Phe-Arg-Try-Gly-Oh described in Example 1 into 610 mg. of the protected decapeptide:

BOC-D-Ser-D-Tyr-Ser-Glu
(OtBu)-His-D-Phe-Arg-Tyr-Gly-OH from which the 1-D-Ser-2-D-Tyr-7-D-Phe-decapeptide is obtained by splitting off the protecting groups. Yield: 397 mg.

Example 4

Synthesis of the 7-D-Phe-8-D-Arg-decapeptide. 9.24 gm. of BOC-D-Arg-($NO_2$)-OH of melting point 108–110° C. and $[\alpha]_D = +7.0°$ in dimethylformamide are coupled by the mixed anhydride method with 11.0 gm. of H-Try-Gly-OMe as monoacetate into 6.5 gm. (40%) of BOC-D-Arg($NO_2$)-Try-Gly-OMe of $[\alpha]_D = -24.7°$ in MeOH. Four gm. of this tripeptide are, after splitting off the BOC group, coupled with 2.2 gm. of BOC-D-Phe-ONP described in Example 1 into the tetrapeptide BOC-D-Phe-D-Arg($NO_2$)-Try-Gly-OMe in a yield of 2.5 gm. After splitting off the BOC group and coupling with Z-Glu(OtBu)-His-$N_3$, 2.05 gm. of Z-Glu(OtBu)His-D-Phe-D-Arg($NO_2$)-Try-Gly-OMe are obtained. 950 mg. of this material are, after saponification and hydrogenation, coupled with BOC-Ser-Tyr-Ser-Met-$N_3$ into BOC-Ser-Tyr-Ser-Met-Glu-(OtBu)-
His-D-Phe-D-Arg-Try-Gly-OH Yield 510 mg. After treatment with a mixture of trifluoroacetic acid-water (10:1), followed by a treatment with an ion exchanger in the acetate form 255 mg. are finally obtained of the 7-D-Phe-8-D-Arg-decapeptide

EXAMPLE 5

Synthesis of the 1-D-Ser-2-D-Tyr-7-D-Phe-8-D-Arg-decapeptide. 660 mg. of of BOC-D-Ser-D-Ser-Met-$N_3$ described in Example 3 are coupled with 740 mg. of H-Glu(OtBu)-His-D-Phe-D-Arg-Try-Gly-OH from Example 4 into the protected decapeptide:

BOC - D - Ser-D-Tyr-Ser-Met-Glu-(OtBu)-His-D-Phe-D-Arg-Try-Gly-OH in a yield of 490 mg. After splitting off the protecting groupings and exchanging the trifluoroacetate 245 mg. of the 1-D-Ser-2-D-Tyr-7-D-Phe-8-D-Arg-decapeptide are obtained from it.

EXAMPLE 6

Suspension of 7-D-Phe-decapeptide. 200 μg. of the 7-D-Phe-decapeptide was dissolved in 6 ml. 0.01 N HCl. A mixture containing 0.3 ml. $ZnCl_2$ (104 mg. $ZnCl_2$ per ml.), 1 ml. $Na_2HPO_4$ (6.3 mg. $Na_2HPO_4 \cdot 2H_2O$ per ml. +35.0 mg. NaCl per ml.) and 0.5 ml. 0.1 N HCl was added to the peptide solution under stirring. The pH of the final mixture was then brought to 7.8–8.0 with 0.5 N NaOH and the total volume of the complex was subsequently adjusted to 10 ml. with distilled water. Administration of this preparation to conditioned rats caused an unexpected extinction of their avoidance behavior, as follows from Table 3.

EXAMPLE 7

Suspensions of 2-D-Tyr-7-D-Phe-decapeptide. 17.7 mg. of the 2-D-Tyr-7-D-Phe-decapeptide were dissolved in 10.62 ml. 0.01 N HCl. To 3 ml. of this solution were added 0.06 ml. zinc chloride solution, containing 50 mg. zinc per ml. Then the pH was adjusted to 8.1–8.5 by the addition of 0.5 N NaOH solution. The suspension obtained contained 0.6 mg. zinc and 1 mg. peptide per ml. Practically all the peptide was adsorbed on the $Zn(OH)_2$ formed and only a few percent were found in solution. In the same way two suspensions containing 0.3 mg. and 0.15 mg. zinc respectively per ml. and 1 mg. peptide per ml. were prepared. The effect of said suspensions on the avoidance behavior of rats was similar to that of the suspension of Example 6.

EXAMPLE 8

Suspension of 1 - D - Ser-2D-Tyr-7-D-Phe-decapeptide. 1.5 ml. of $ZnCl_2$ solution containing 50 mg. zinc per ml. were added to the solution of 31.5 mg.

$Na_2HPO_4 \cdot 2H_2O$ in 2 ml. water. The precipitate formed was dissolved by the addition of 2 drops of 4 N HCl. Next 5 mg. of the peptide were dissolved in 4 ml. water and to this solution the prepared zinc phosphate solution was added. Finally 7.5 ml. of this mixture and 3.3 ml. 0.6 N NaOH were simultaneously added to 12.5 ml. of the solution of 2% benzylalcohol and 0.3% NaCl in 0.6 N NaOH. The end-pH is 8.0; the volume was adjusted to 25 ml. with 1.7 ml. water. The suspension obtained exerts a similar effect on the avoidance behavior as the suspensions of the Examples 6 and 7.

What is claimed is:
1. A decapeptide having the sequence:

L-Ser-L-Tyr-L-Ser-L-Met-L-Glu-
L-His-D-Phe-L-Arg-L-Try-Gly and functional derivatives thereof selected from the group consisting of pharmaceutically acceptable acid addition salts, unsubstituted carboxylamide, and complexes of metals selected from the group consisting of zinc, nickel, cobalt, copper and iron.

2. A sparingly soluble complex compound selected from the group consisting of a pharmaceutically acceptable insoluble salt, hydroxide and oxide of a metal selected from the group consisting of zinc, nickel, cobalt, copper and iron, and a decapeptide as described in claim 1.

3. A sparingly soluble complex compound selected from the group consisting of a phosphate, a hydroxide and an oxide of zinc, and a decapeptide as described in claim 1.

References Cited

UNITED STATES PATENTS 3,093,627  6/1963  Schwyzer et al. ____ 260—112.5
3,228,926  1/1966  Kappeler et al. ____ 260—112.5
3,256,526  6/1966  Schwyzer et al. ____ 260—112.5

OTHER REFERENCES

Inouye, Bull. Chem. Soc. Japan 38, 1148–1151 (1965).
Otsuka et al., Bull. Chem. Soc. Japan 37, 289–290 (1964).
Schnabel et al., J. Am. Chem. Soc. 82, 4576–4579 (1960).
Tanaka et al., Arch. Biochem. Biophys. 99, 294–298 (1962).

LEWIS GOTTS, Primary Examiner

MELVYN KASSENOFF, Assistant Examiner

U.S. Cl. X.R.
424—177, 179